United States Patent [19]

Burger et al.

[11] Patent Number: 4,802,638
[45] Date of Patent: Feb. 7, 1989

[54] CORD STOWAGE APPARATUS

[75] Inventors: Marilyn S. Burger, Pompano; John M. McKee, Coral Springs, both of Fla.

[73] Assignee: Motorola, Inc., Schaumburg, Ill.

[21] Appl. No.: 79,052

[22] Filed: Jul. 29, 1987

[51] Int. Cl.$^4$ ............................................. B65H 75/40
[52] U.S. Cl. ...................... 242/85.1; 242/96; 242/100.1
[58] Field of Search ............... 242/96, 85, 85.1, 100, 242/100.1, 107.1–107.15, 118–118.8, 129, 116; 24/71.2, 71.3, 129 A; 191/12.2 R, 12.4, 12 R

[56] References Cited

U.S. PATENT DOCUMENTS

| 182,651 | 9/1876 | Ellwood | 24/71.3 |
|---|---|---|---|
| 2,029,975 | 2/1936 | Winchester | 242/129 |
| 2,364,262 | 12/1944 | Wehringer | 242/85.1 |
| 2,533,495 | 12/1950 | Moffett | 242/129 |
| 2,533,731 | 12/1950 | Gombert | 242/129 |
| 2,545,145 | 3/1951 | Hoyle | 242/118.4 |
| 2,824,709 | 2/1958 | Macy | 242/129 |
| 3,062,475 | 11/1962 | Miller | 242/85.1 |
| 3,138,309 | 6/1964 | Hulterstrum | 242/129 X |
| 3,430,886 | 3/1969 | Sweeney | 242/118.7 |
| 4,643,076 | 1/1987 | Eckert et al. | 242/118.7 |

Primary Examiner—John M. Jillions
Attorney, Agent, or Firm—Michael J. DeLuca; Vincent B. Ingrassia; Anthony J. Sarli, Jr.

[57] ABSTRACT

A cord stowage device is provided which includes a spool having a channel through which a cable slidably passes from one side of the spool to the other side of the spool. First and second cup-shaped members are attached to respective ends of the spool. Each cup-shaped member includes a concave surface which faces toward the spool and the other cup-shaped member such that the first and second members grasp the cable as it enters the stowage device and as it exits the stowage device. The stowage device is positioned at the desired position on the cable by sliding the cable therethrough. When the stowage device reached the desired position on the cable, any excess slack cable in wound around the spool of the stowage device.

12 Claims, 6 Drawing Sheets

CORD STOWAGE APPARATUS

BACKGROUND OF THE INVENTION

This invention relates in general to apparatus for storing excess wire, cable and other cordage. More particularly, the invention relates to apparatus for storing the excess cordage which often results when a radio user installs a radio at one location on the body and then connects the radio to a peripheral device which is situated elsewhere on the body.

In portable radio communications systems, the user commonly wears a portable radio on his or her belt. For privacy and other reasons, radio users often will use an earphone situated in the user's ear. In that case, an electrical cable generally extends from the ear-mounted earphone to the belt-mounted radio so as to couple audio signals from the radio to the earphone. To accommodate the varying heights of different users, such electrical cables are usually manufactured to be longer than necessary for the average users. Thus, there is often excess slack or excess cordage in the cable between the earphone and the belt-mounted portable radio. Those skilled in the art appreciate that excess cordage occurs in many other situations in which cable is employed.

One approach which has been used in the past to solve the problem of excess cordage is to provide a "stuff bag" into which all of the excess cable is placed. Unfortunately, when such stuff bags are used to accept excess cable, the cable tends to becomes tangled and difficult to remove from the stuff bag.

BRIEF SUMMARY OF THE INVENTION

One object of the present invention is to provide a cord stowage apparatus which stores excess cordage in a cable.

Another object of the present invention is to provide a cord stowage apparatus which stores cable in a manner such that the cable does not become tangled.

Another object of the invention is to provide a cord stowage apparatus which can slide along the cable so as to be positionable at any position on the cable.

In one embodiment, the cord stowage apparatus includes a spool of flexibly resilient material having first and second opposed ends. The spool further includes a channel through which the cord is slidable when the apparatus is being positioned on the cord. A first cup-shaped member of flexibly resilient material includes a substantially concave surface and a center which is connected to the first end of the spool. The first cup-shaped member includes a first rim. A second cup-shaped member of flexibly resilient material includes a substantially concave surface and a center which is connected to the second end of the spool. The second cup-shaped member includes a second rim. The first and second members are situated such that the concave surfaces thereof face each other and such that the first and second rims engage the cord as it enters and exits the apparatus.

In another embodiment of the invention, the cord stowage apparatus includes a spool having first and second opposed ends and a channel through which the cord slides when the apparatus is being positioned on the cord. A first flexibly resilient cup-shaped member includes a rim and a center connected to the first end of the spool. The first member is positionable in first and second positions. The first position is defined such that the first member includes a substantially concave surface which faces away from the spool. The second position is defined such that the first member includes a substantially concave surface which faces toward the spool. A second flexibly resilient cup-shaped member includes a rim and a center connected to the second end of the spool. The second member is positionable in third and fourth positions. The third position is defined such that the second member includes a substantially concave surface which faces away from the spool. The fourth position is defined such that the second member includes a substantially concave surface which faces toward the spool. The rims of the first and second members engage the cord therebetween when the first and second member are in the second and fourth positions, respectively.

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
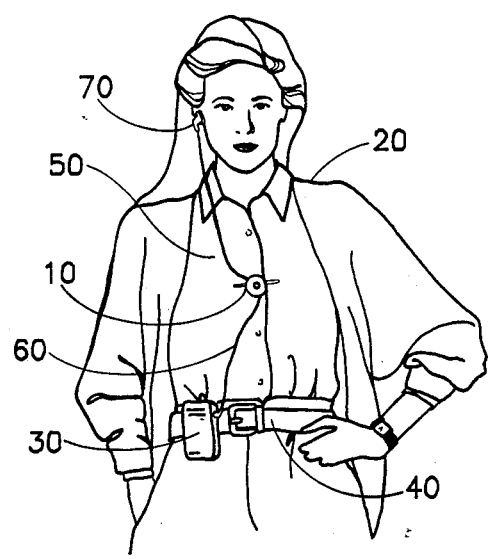
FIG. 1 is a representation showing the cord stowage apparatus of the invention mounted on a user.

Turning now to FIG. 1, one embodiment of the cord stowage apparatus of the invention is shown as cord stowage device 10. FIG. 1 depicts a radio user 20 wearing a radio 30 which is attached to the user's belt 40. Cord stowage device 10 is shown as being attached to an article of clothing 50, for example the user's shirt. Cord stowage device 10 is conveniently used to take up the excess slack in an audio cable 60 which couples the audio output of radio 30 to an earphone 70 placed in the user's ear.

Figure 2:
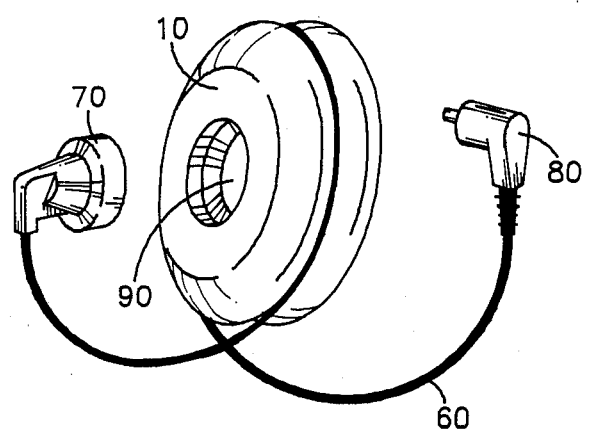
FIG. 2 is a perspective view of the cord stowage apparatus of the invention.

FIG. 2 is a perspective view of cord stowage device 10 which shows device 10 more clearly. In FIG. 2, cable 60 is shown as being wound around device 10 to take up slack in cable 60. An earphone 70 is connected to one end of cable 60. Audio plug 80 is connected to the remaining end of cable 70. Cord stowage device 10 includes a cavity 90 shaped to receive earphone 70 therein for storage purposes. That is, earphone 70 and cavity 90 are shaped to mate with each other such that earphone 70 is held in cavity 90 by a friction fit.

Figure 3:
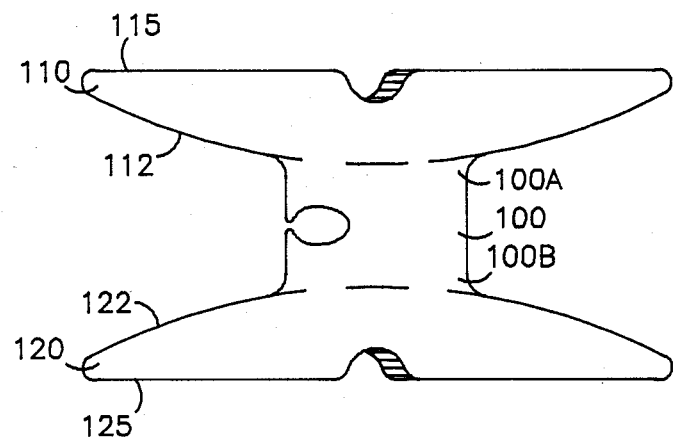
FIG. 3 is a side view of the cord stowage apparatus of the invention after manufacture.

One way to fabricate device 10 is to mold device 10 as a single piece of flexible resilient material. For example, device 10 is molded into the preliminary form shown in FIG. 3. As seen in FIG. 3, cord stowage device 10 includes a spool 100 having opposed ends 100A and 100B. Cup-shaped members 110 and 120 are connected to opposed ends 100A and 100B, respectively. Cup-shaped members 110 and 120 include respective surfaces 112 and 122 which are initially substantially convex as shown in FIG. 3. Members 110 and 120 include respective rims 115 and 125, which in one embodiment are substantially circular.

Figure 4:
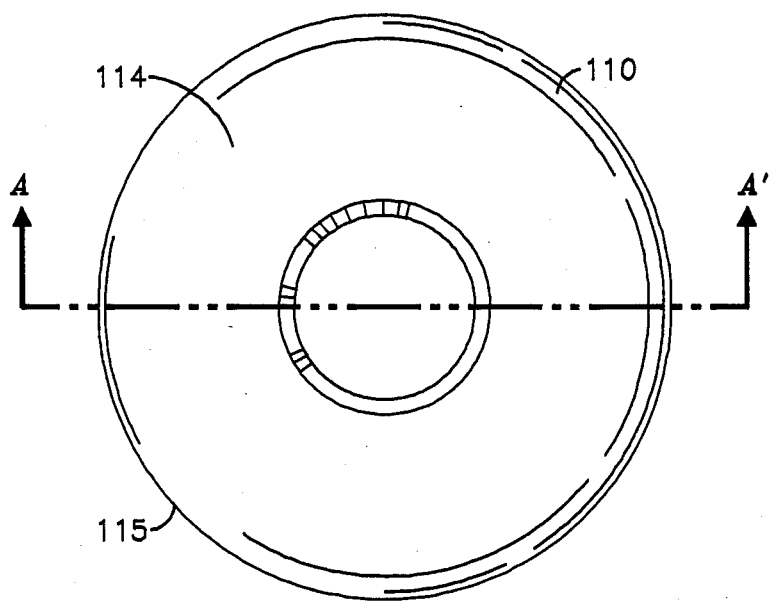
FIG. 4 is a top view of the cord stowage apparatus of the invention.
Figure 5:
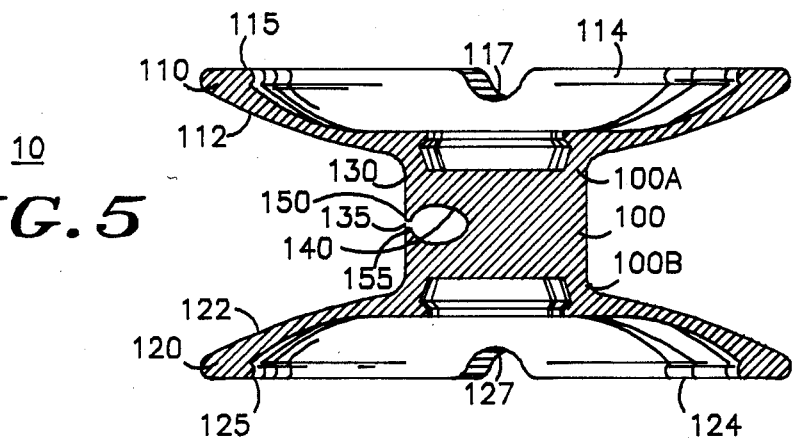
FIG. 5 is a cross sectional view of the cord stowage apparatus along section line A—A' of FIG. 4.

As seen in FIG. 5, which is a cross section along line A—A' of the top view of the cord stowage device 10 shown in FIG. 4, cup-shaped members 110 and 120 include respective surfaces 114 and 124 Surfaces 114 and 124 are initially substantially concave as shown in FIG. 5. Spool 100 includes a peripheral surface 130 upon which cable 60 can be wound. Spool 100 further includes a channel 140 which passes from one location on surface 130 through spool 100 to another location on surface 130 as seen in FIG. 5 and more clearly in FIG. 9. Channel 130 exhibits a size and geometry appropriate to permit cable 60 (not shown in FIG. 5) to relatively freely slide therethrough prior to winding the excess slack in cable 60 around spool 100. In the particular embodiment of the invention shown in FIG. 5, channel 130 exhibits an elliptical geometry. In this particular embodiment, elliptical channel 130 opens onto surface 130 at opening 135 so as to form lips 150 and 155. Lips 150 and 155 retain cable 60 in channel 130.

Figure 6:
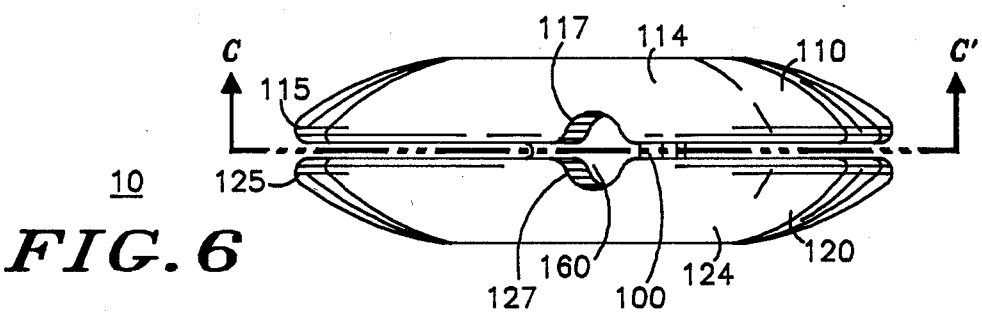
FIG. 6 is a side view of the cord stowage apparatus of the invention after the cup members have been moved into operating position.

Members 110 and 120 are conveniently fabricated as an integral part by conventional molding processes. In contrast to FIG. 5 which shows device 10 in the "open state" in which device 10 is formed by such molding process, FIG. 6 shows device 10 in the "closed state" in which it is most commonly used. That is, after a molding operation is used to fabricate the structure shown in FIG. 5 cup-shaped members 110 and 120 face away from each other and spool 100. Cup-shaped members 110 and 120 are then stretchably reversed such they are configured facing each other in the "closed state" depicted in FIG. 6. That is, in the "closed state", cup-shaped members 110 and 120 are forcibly biased to the shape shown in FIG. 6 by the inward radial elastic forces of rims 115 and 125, respectively. These radial elastic forces which are exerted by the stretched members 110 and 120, pull rims 115 and 125, respectively, inward toward spool 100 to achieve the "closed state"

When cup-shaped member 110 is in the "closed state" position of FIG. 6, surface 114 exhibits a substantially convex shape and surface 112 exhibits a substantially concave shape. Similarly, when cup-shaped member 120 is in the "closed state" of FIG. 6, surface 124 exhibits a substantially convex shape and surface 122 exhibits a substantially concave shape.

Returning momentarily to FIG. 5, it is noted that cup-shaped members 110 and 120 include respective vertically aligned notches 117 and 127. When members 110 and 120 are positioned in the "closed state" position shown in FIG. 6, notches 117 and 127 together form a channel 160 in which cable 60 (not shown) is slidably engaged by members 110 and 120. In one embodiment, notches 117 and 127 are shaped such that channel 160 exhibits a substantially ellipsoidal geometry.

It is noted that in FIG. 6, the spacing between members 110 and 120 has been exaggerated for clarity. In fact, in one embodiment of the invention, rims 115 and 125 of members 110 and 120 actually are in contact with each other due to the elastic forces which pull rims 115 and 125 inward toward spool 100. Thus, as cable 60 (shown in subsequent drawings) is wound around spool 100, rims 115 and 125 are pushed apart at each point along rims 115 and 125 which cable 60 contacts in the course of winding. When the desired amount of slack cable 60 is wound around spool 100, cable 60 is situated so as to rest in channels 160 and 190. Cable 60 is slidably engaged by channels 160 and 190. Channels 160 and 190 are sufficiently narrow to prevent cable 60 from undesirably spilling off spool 100 without user intervention. That is, channels 160 and 190 grip cable 60 with sufficient tension such that the user must actively pull on cable 60 before cable 60 will unwind from spool 100.

Figure 7:
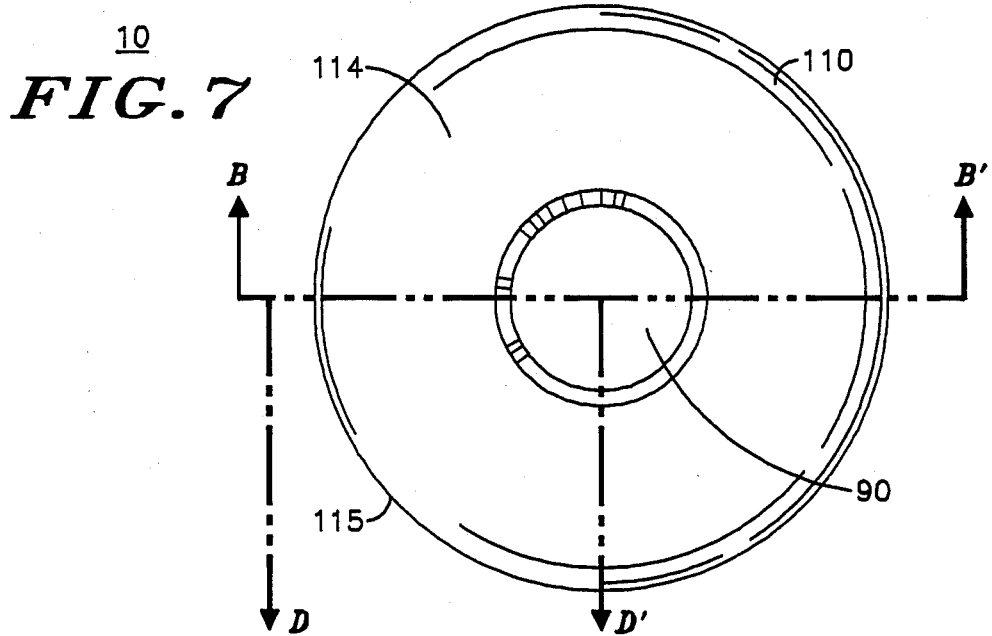
FIG. 7 is a top view of the cord stowage device of FIG. 6.

FIG. 7 shows a top view of the stowage device 10 in the "closed state". Cavity 90, which receives earphone 70 therein, is shown in FIG. 7 and is seen even more clearly in FIG. 8.

Figure 8:
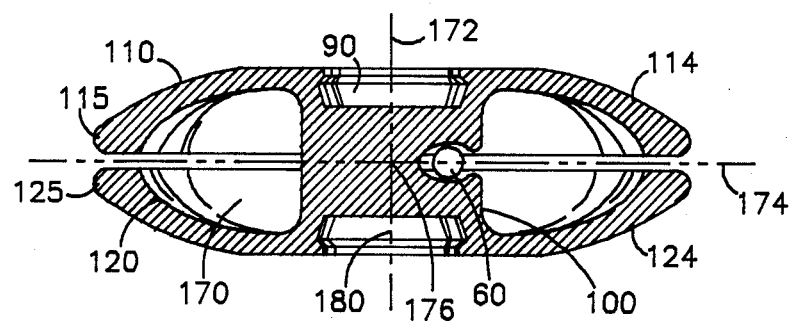
FIG. 8 is a cross sectional view of the cord stowage apparatus along section line B—B' of FIG. 7.

FIG. 8 is a sectional view of cord stowage device 10 of FIG. 7 along a section line B—B'. When device 10 is in the "closed state" as shown in FIG. 8, an inner cavity 170 or chamber is formed for holding cable 60 which is to be wound around spool 100. Cup-shaped member 120 includes a cavity 180 which is appropriately shaped for receiving a mounting clip therein as discussed subsequently. Spool 100 exhibits a major axis 172 and a minor axis 174 normal thereto as depicted in FIG. 8. Major axis 172 and minor axis 174 intersect at the center 176 of spool 100.

Figure 9:
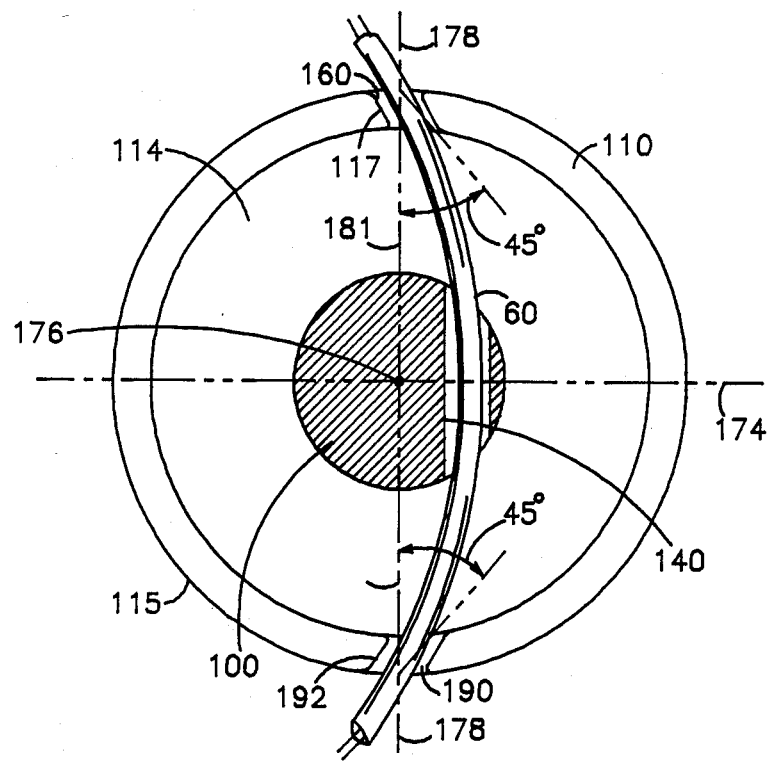
FIG. 9 is a cross sectional view of the cord stowage apparatus along section line C—C' of FIG. 6. and with a cable situated in the notch of the central spool.

FIG. 9 is a sectional view of cord stowage device 10 of FIG. 6 along a section line C—C'. In FIG. 9, an axis 178 is drawn through rim 115 and the center of cylindroidal spool 100. Axis 178 is normal to axis 174. This view of device 10 more clearly shows notch 117 of channel 160 through which cable 60 passes. Device 10 is depicted in the "unwound mode" in which slack still exists in cable 60 which has not yet been wound on spool 100. Another channel 190, substantially identical to channel 160, is partially shown in FIG. 9 as notch 192 in cup-shaped member 110. A corresponding notch (not shown) is included in cup-shaped member 120 in rim 125 adjacent notch 192 such that notch 192 and the unshown notch together form channel 190. Channels 160 and 190 are located on rim 115 approximately 180° apart from each other although other angles could be used as well as long as the angle selected permits relatively free movement of cable 60 through channel 140 when cable 60 is in the "unwound mode " position It is noted that channel 140 forms a chord through spool 100. Thus, channel 140 is a chordal channel which is offset with respect to center 176.

As seen in FIG. 9, channels 160 and 190 are oriented obliquely with respect to radial lines 181 and 183 drawn from center 176 to channels 160 and 190, respectively. That is, channels 160 and 190 slant inwardly away from rim 115 and toward channel 140. The channel angle of channel 160 is defined to be the angle between radial line 181 and channel 160. The channel angle of channel 190 is defined to be the angle between radial line 183 and channel 190. The selection of appropriate channel angles for channels 160 and 190 facilitates movement of cable 60 through hordal channel 140 which, as mentioned, is offset with respect to the center 176 of device 10 as seen in FIG. 9. In the embodiment of the invention shown in FIG. 9, the channel angle of channels 160 and 190 are selected to be approximately 45°. Channel angles smaller or larger than 45° may also be used as long as the channel angle is not so small or so large as to substantially impede the movement of cable 60 through offset chordal channel 160.

Figure 10:
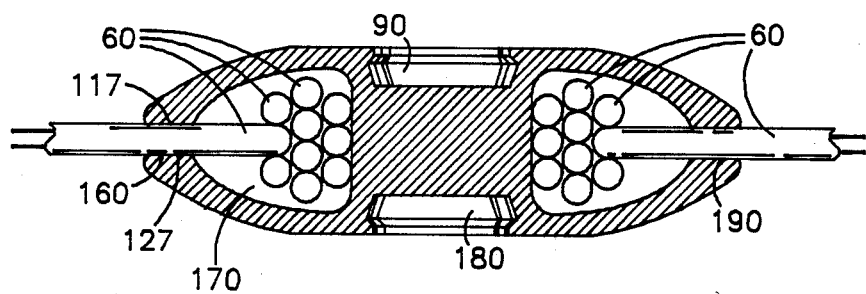
FIG. 10 is the same cross sectional view as in FIG. 8 except the cord stowage apparatus is shown loaded with cable.

FIG. 10 is a sectional view of cord stowage device 10 of FIG. 7 along section line B—B'. Device 10 is illustrated with cable 60 in the "wound-up" mode such that device 10 takes up any slack which would otherwise be present in cable 60. Excess cable is wound clockwise on spool 100 as viewed in FIG. 10 and is stored in cavity 170.

Figure 11:
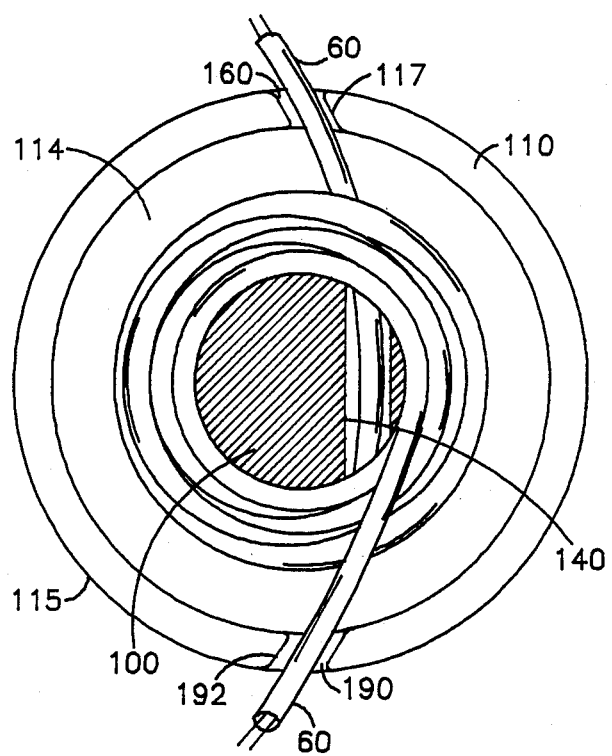
FIG. 11 is the same cross sectional view as in FIG. 9 except that the cord stowage apparatus is shown loaded with cable.

FIG. 11 is a sectional view of cord stowage device 10 of FIG. 6 along a section line C—C'. This view again shows device 10 with excess cable 60 stored therein. That is, device 10 is depicted in the "wound-up" state in which the slack cable of cable 60 has been wound around spool 100.

Figure 12:
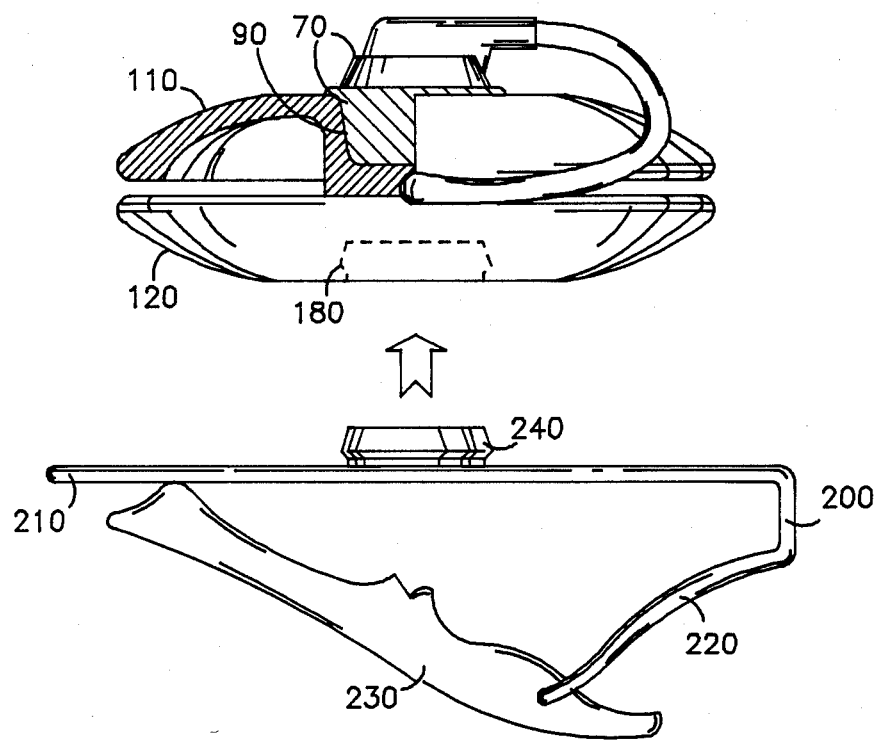
FIG. 12 is a cross sectional view of the cord stowage apparatus along a section line D—D' of FIG. 7, together with a detachable mounting clip.

FIG. 12 is a cutaway sectional view of the cord stowage device 10 of FIG. 7 taken along a partial section line D—D'. The cutaway section is used to more clearly show the placement of earphone 70 in earphone receiving chamber 90. Chamber 90 and earphone 70 are appropriately sized such that earphone 70 mates with chamber 90 and is held therein by a friction fit.

A clasp 200 is attached to FIG. 12 in the manner shown in FIG. 12. Clasp 200 includes a main bar 210 attached to a support arm 220. A spring-loaded swivel arm 230 is attached to support arm 220 in the same manner as used in common tie clasps. Clasp 200 includes a mating element 240 which is appropriately shaped to mate with chamber 180 (shown in dashed lines) and to fit therein by a friction fit.

Should the user desire to inspect the condition of the cable 60 stored in device 10, this can be conveniently accomplished without removing the cable from device 10 by moving cup-shaped members 110 and 120 back to the "open state" configuration of FIG. 5. Once the inspection is completed, members 110 and 120 are returned to the "closed state" configuration of FIG. 6. It is noted that the user need not configure device 10 in the "open state" in order to wind cable 60 therein. Rather, device 10 is generally left in the "closed state" while winding cable 60 therein.

The foregoing describes a cord stowage apparatus which consumes excess cordage in a cable. The cord stowage apparatus stores cable in a manner such that the cable does not become tangled. Moreover cable is stored in a manner such that the stowage device is positionable at any position on the cable.

While only certain preferred features of the invention have been shown by way of illustration, many modifications and changes will occur to those skilled in the art. Those skilled in the art will appreciate that the present invention may be used to take up slack in cables attached between many different types of devices other than the portable radio and remote earphone given by way of example. For example, the cord stowage device may be used to connect a portable radio to a remote microphone worn by the user. It is, therefore, to be understood that the present claims are intended to cover all such modifications and changes which fall within the true spirit of the invention.

We claim:
1. A cord stowage apparatus for stowing cord comprising:
a spool including first and second opposed ends, the spool including a channel through which the cord slides when the apparatus is being positioned on the cord;
a first flexibly resilient cup-shaped member including a rim and a center connected to the first end of the spool, the first member being positionable in first and second positions, the first position being defined such that the first member includes a substantially concave surface which faces away from the spool, the second position being defined such that the first member includes a substantially concave surface which faces toward the spool,
a second flexibly resilient cup-shaped member including a rim and a center connected to the second end of the spool, the second member being positionable in third and fourth positions, the third position being defined such that the second member includes a substantially concave surface which faces away from the spool, the fourth position being defined such that the second member includes a substantially concave surface which faces toward the spool,
the rims of the first and second members engaging the cord therebetween when the first and second member are in the second and fourth positions, respectively.

2. The apparatus of claim 1 wherein the first and second rims include first and second aligned notches which together form a second channel sufficiently large to pass the cable therethrough as such cable enters the apparatus.

3. The apparatus of claim 1 wherein the first and second rims include third and fourth aligned notches which together form a third channel sufficiently large to pass the cable therethrough as such cable exits the apparatus.

4. The apparatus of claim 1 wherein the spool includes a peripheral surface adapted for winding of the cord, the channel extending between a first point on the peripheral surface and a second point on the surface.

5. The apparatus of claim 1 wherein the spool exhibits a substantially cylindroidal shape.

6. The apparatus of claim 1 wherein the channel is a chordal channel offset with respect to a diameter of said spool.

7. The apparatus of claim 1 wherein the channel is elliptically shaped.

8. The apparatus of claim 1 wherein the rims of the first and second members are substantially circularly shaped.

9. The apparatus of claim 1 wherein the rims of the first and second members include first and second aligned grooves which together form a second channel when the first and second members are in the second and fourth positions respectively, the second channel being sufficiently large to pass the cable therethrough as such cable enters the apparatus.

10. The apparatus of claim 1 wherein the rims of the first and second members include third and fourth aligned grooves which together form a third channel when the first and second members are in the second and fourth positions respectively, the second channel being sufficiently large to pass the cable therethrough as such cable exits the apparatus.

11. The cord stowage device of claim 1 wherein the first and second members include aligned first notches at adjacent first locations on the respective rims thereof, the first grooves being appropriately dimensioned to engage the cord while permitting the cord to pass substantially freely therethrough when the first and second members are in the second and fourth positions respectively.

12. The cord stowage device of claim 1 wherein the first and second members include aligned second grooves at adjacent second locations on the respective rims thereof, the second notches being appropriately dimensioned to engage the cord while permitting the cord to pass substantially freely therethrough when the first and second members are in the second and fourth positions respectively.

* * * * *